US006871317B1

(12) United States Patent
Corbett

(10) Patent No.: US 6,871,317 B1
(45) Date of Patent: Mar. 22, 2005

(54) TECHNIQUE FOR EFFICIENTLY ORGANIZING AND DISTRIBUTING PARITY BLOCKS AMONG STORAGE DEVICES OF A STORAGE ARRAY

(75) Inventor: Peter F. Corbett, Lexington, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 641 days.

(21) Appl. No.: 10/010,315

(22) Filed: Nov. 13, 2001

(51) Int. Cl.[7] .............................................. G06F 11/00
(52) U.S. Cl. ...................................................... 714/800
(58) Field of Search ................................ 714/800–805, 714/6, 7, 770; 711/114

(56) References Cited

U.S. PATENT DOCUMENTS

| | | | |
|---|---|---|---|
| 5,537,567 A | * 7/1996 | Galbraith et al. | ........... 711/114 |
| 5,579,475 A | * 11/1996 | Blaum et al. | ................... 714/7 |
| 5,819,292 A | 10/1998 | Hitz et al. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,138,125 A | 10/2000 | DeMoss | |
| 6,138,126 A | 10/2000 | Hitz et al. | |
| 6,158,017 A | * 12/2000 | Han et al. | ....................... 714/6 |
| 6,247,157 B1 | * 6/2001 | Edirisooriya | ................ 714/767 |
| 6,289,356 B1 | 9/2001 | Hitz et al. | |

OTHER PUBLICATIONS

Lee et al., Double parity sparing for improvement of performance and reliability in disk arrays, 1996, IEEE, gp. 345–348.*

David Hitz et al. TR3002 File System Design for a NFS File Server Appliance published by Network Appliance, Inc.

Common Internet File System (CIFS) Version: CIFS–Spec 0.9, Storage Networking Industry Association (SNIA), Draft SNIA CIFS Documentation Work Group Work–in–Progress, Revision Date: Mar. 26, 2001.

Fielding et al. (1999) Request for Comments (RFC) 2616, HTTP/1.1.

Mario Blaum, Jim Brady, Jehoshua Bruck and Jai Menon, Evenodd: An Efficient Scheme for Tolerating Double Disk Failures in RAID Architectures, IEEE Transactions on Computers, vol. 44, No. 2, Feb. 1995, pp. 192–202.

* cited by examiner

Primary Examiner—Shelly A Chase
(74) Attorney, Agent, or Firm—Cesari and McKenna, LLP; A. Sidney Johnston

(57) ABSTRACT

A distributed parity technique organizes and distributes parity blocks among storage devices of an array coupled to a storage system. The array illustratively comprises a plurality of disks, each of which is divided into blocks of fixed size. The blocks are then organized into stripes, wherein each stripe contains one disk that holds only row parity blocks, another disk that holds only diagonal parity blocks and the remaining disks that hold data blocks. The number of blocks on each disk of each stripe is initially equal such that an even disk length arises within each stripe. Thereafter, an extra parity block is appended to the end of the disk holding the diagonal parity blocks within each stripe. Each block of the array is assigned to two parity sets and any one or any combination of two disks can fail concurrently and the data on the failed disks can be reconstructed.

30 Claims, 5 Drawing Sheets

| DATA DISK 0 | DATA DISK 1 | DATA DISK 2 | DATA DISK 3 | DATA DISK 4 | ROW PARITY DISK | DIAGONAL PARITY DISK |
|---|---|---|---|---|---|---|
| D04 | D05 | D06 | D07 | D0X | P0 | P4X |
| D15 | D16 | D17 | D1X | D14 | P1 | P5X |
| D26 | D27 | D2X | D24 | D25 | P2 | P6X |
| D37 | D3X | D34 | D35 | D36 | P3 | P7X |

FIG. 1
(PRIOR ART)

| | DISK 0 | DISK 1 | DISK 2 | DISK 3 | DISK 4 | DISK 5 | DISK 6 |
|---|---|---|---|---|---|---|---|
| 410 | S0 D04 | S0 D05 | S0 D06 | S0 D07 | S0 D08 | S0 P0 | S0 P4 |
| | S0 D15 | S0 D16 | S0 D17 | S0 D18 | S0 D14 | S0 P1 | S0 P5 |
| | S0 D26 | S0 D27 | S0 D28 | S0 D24 | S0 D25 | S0 P2 | S0 P6 |
| | S0 D37 | S0 D38 | S0 D34 | S0 D35 | S0 D36 | S0 P3 | S0 P7 |
| 410 | S1 D05 | S1 D06 | S1 D07 | S1 D08 | S1 P0 | S1 P4 | S0 P8 |
| | S1 D16 | S1 D17 | S1 D18 | S1 D14 | S1 P1 | S1 P5 | S1 D04 |
| | S1 D27 | S1 D28 | S1 D24 | S1 D25 | S1 P2 | S1 P6 | S1 D15 |
| | S1 D38 | S1 D34 | S1 D35 | S1 D36 | S1 P3 | S1 P7 | S1 D26 |
| 410 | S2 D06 | S2 D07 | S2 D08 | S2 P0 | S2 P4 | S1 P8 | S1 D37 |
| | S2 D17 | S2 D18 | S2 D14 | S2 P1 | S2 P5 | S2 D04 | S2 D05 |
| | S2 028 | S2 D24 | S2 D25 | S2 P2 | S2 P6 | S2 D15 | S2 D16 |
| | S2 D34 | S2 D35 | S2 D36 | S2 P3 | S2 P7 | S2 D26 | S2 D27 |
| | | | | | S2 P8 | S2 D37 | S2 D38 |

| | DISK 0 | DISK 1 | DISK 2 | DISK 3 | DISK 4 | DISK 5 | DISK 6 |
|---|---|---|---|---|---|---|---|
| | S6 P4 | | | | | | |
| 410 | S6 P5 | S6 D04 | S6 D05 | S6 D06 | S6 D07 | S6 D08 | S6 P0 |
| | S6 P6 | S6 D15 | S6 D16 | S6 D17 | S6 D18 | S6 D14 | S6 P1 |
| | S6 P7 | S6 D26 | S6 D27 | S6 D28 | S6 D24 | S6 D25 | S6 P2 |
| | S6 P8 | S6 D37 | S6 D38 | S6 D34 | S6 D35 | S6 D36 | S6 P3 |

FIG. 4

TECHNIQUE FOR EFFICIENTLY ORGANIZING AND DISTRIBUTING PARITY BLOCKS AMONG STORAGE DEVICES OF A STORAGE ARRAY

FIELD OF THE INVENTION

The present invention relates to arrays of storage systems and, more specifically, to a technique for efficiently reconstructing any one or combination of two failing storage devices of a storage array.

BACKGROUND OF THE INVENTION

A file server is a computer that provides file service relating to the organization of information on writeable persistent storage devices, such as memories, tapes or disks of an array. The file server or filer may be embodied as a storage system including an operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A storage system may be further configured to operate according to a client/server model of information delivery to thereby allow many clients to access files stored on a server, e.g., the storage system. In this model, the client may comprise an application executing on a computer that "connects" to the storage system over a computer network, such as a point-to-point link, shared local area network, wide area network or virtual private network implemented over a public network, such as the Internet. Each client may request the services of the file system on the storage system by issuing file system protocol messages (in the form of packets) to the system over the network. It should be noted, however, that the storage system may alternatively be configured to operate as an assembly of storage devices that is directly-attached to a (e.g., client or "host") computer. Here, a user may request the services of the file system to access (i.e., read and/or write) data from/to the storage devices.

A common type of file system is a "write in-place" file system, an example of which is the conventional Berkeley fast file system. In a write in-place file system, the locations of the data structures, such as data blocks, on disk are typically fixed. Changes to the data blocks are made "in-place" in accordance with the write in-place file system. If an update to a file extends the quantity of data for the file, an additional data block is allocated.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system, such as a filer, is the Write Anywhere File Layout (WAFL™) file system available from Network Appliance, Inc., Sunnyvale, Calif. The WAFL file system is implemented as a microkernel within an overall protocol stack of the filer and associated disk storage.

The disk storage is typically implemented as one or more storage "volumes" that comprise a cluster of physical storage devices (disks), defining an overall logical arrangement of disk space. Each volume is generally associated with its own file system. The disks within a volume/file system are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In the operation of a disk array, it is fairly common that a disk will fail. A goal of a high performance storage system is to make the mean time to data loss (MTTDL) as long as possible, preferably much longer than the expected service life of the system. Data can be lost when one or more storage devices fail, making it impossible to recover data from the device. Typical schemes to avoid loss of data include mirroring, backup and parity protection. Mirroring is an expensive solution in terms of consumption of storage resources, such as hard disk drives. Backup does not protect recently modified data. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction are on 1-bit vectors equivalent to an exclusive-OR (XOR) logical operation, and the addition and subtraction operations are replaced by XOR operations. The data is then protected against the loss of any of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

As used herein, the term "encoding" means the computation of a redundancy value over a predetermined subset of data blocks, whereas the term "decoding" means the reconstruction of a data or parity block by the same process as the redundancy computation using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

Parity schemes generally provide protection against a single disk failure within a parity group. These schemes can also protect against multiple disk failures as long as each failure occurs within a different parity group. However, if two disks fail concurrently within a parity group, then an unrecoverable loss of data is suffered. Failure of two disks concurrently within a parity group is a fairly common occurrence, particularly because disks "wear out" and because of environmental factors with respect to the operation of the disks. In this context, the failure of two disks concurrently within a parity group is referred to as a "double failure".

A double failure typically arises as a result of a failure of one disk and a subsequent failure of another disk while attempting to recover from the first failure. The recovery or reconstruction time is dependent upon the level of activity of the storage system. That is, during reconstruction of a failed disk, it is desirable that the storage system remain "online" and continue to serve requests (from clients or users) to access (i.e., read and/or write) data. If the storage system is busy serving requests, the elapsed time for reconstruction increases. The reconstruction processing time also increases as the number of disks in the storage system increases, as all of the surviving disks must be read to reconstruct the lost data. Moreover, the double disk failure rate is proportional to the square of the number of disks in a parity group. However, having small parity groups is expensive, as each parity group requires an entire disk devoted to redundant data.

Accordingly, it is desirable to provide a technique that withstands double failures. This would allow construction of larger disk systems with larger parity groups, while ensuring that even if reconstruction after a single disk failure takes a long time (e.g., a number of hours), the system can survive a second failure. Such a technique would further allow relaxation of certain design constraints on the storage system. For example, the storage system could use lower cost disks and still maintain a high MTTDL. Lower cost disks typically have a shorter lifetime, and possibly a higher failure rate during their lifetime, than higher cost disks. Therefore, use of such disks is more acceptable if the system can withstand double disk failures within a parity group.

Known techniques for protecting against double disk failures include XOR-based schemes and Reed-Solomon style encoding schemes. Broadly stated, Reed-Solomon (R-S) style encoding schemes require operations to occur on a stream consisting of one word (usually a byte) of input from each data disk at a time. While this is true of all parity schemes, in the R-S algorithm and other similar approaches, the required operations are matrix multiplies. This increases the number of operations needed to compute the redundant data and the operations needed to reconstruct lost data.

In particular for R-S encoding operations, the redundant data must be computed by performing matrix operations on the incoming byte streams. These operations are computationally intensive, requiring a large number of XOR operations. The use of an XOR operation to perform direct parity computations is relatively easy since the exclusive-OR operation is associative and commutative. The results can be accumulated in a buffer having a size of one block that becomes the parity block. Although it is possible to allow a staged summation for the R-S encoding operations that accumulate results in an output buffer, the lower bound of computation required for a given parity group size using R-S style encoding is larger than that required other schemes.

A simple double failure correcting parity scheme is two-dimensional parity wherein each disk belongs to two different parity sets of a parity array. The parity array is a self-contained set of disks that can recover from any two disk failures in the array. A parity set is a set of blocks, including several data and one parity block, such that each data block and the parity block are taken from different disks in the parity array. The parity block contains the XOR sum of all of the data blocks in the parity set. The data disks used in accordance with the two-dimensional parity scheme are numbered according to a two-dimensional array; however, it is not necessary that the disks be physically arranged in a two-dimensional array. Parity sets extend in both the horizontal and vertical directions, and each disk belongs to both a horizontal and a vertical parity set. The parity disks are logically arrayed at one horizontal and one vertical edge of the array.

Specifically, the two-dimensional parity scheme has a number of parity disks equal to r+c, where n=r×c is the number of data disks. The minimum value of r+c is $2\sqrt{n}$. For a small number of data disks in an array, this is a relatively large amount of parity. The problems with two-dimensional parity are thus two-fold. In order to reduce redundancy and overhead, the number of disks in the parity array must increase. However, the number of disks increases at the expense of increasing total parity size. This can result in unreasonably large "large-write" operation sizes. As used herein, a "large-write" operation involves rewriting of the blocks of one or more overlapping parity sets, whereas a "small-write" operation involves modification of at least one data block and its associated parity.

Another known double failure correcting parity scheme is an EVENODD XOR-based technique that allows a serial reconstruction of lost (failed) disks. EVENODD parity requires exactly two disks worth of redundant data, which is optimal. According to this parity technique, all data disk blocks belong to two parity sets, one a typical RAID-4 style XOR computed across all the data disks and the other computed along a set of diagonally adjacent data disk blocks. Each diagonal parity set contains blocks from all but one of the data disks. For n data disks, there are n−1 rows of blocks in a stripe. Each block is on one diagonal and there are n diagonals, each n−1 blocks in length. Notably, the EVENODD scheme only works if n is a prime number. The EVENODD technique is disclosed in an article of IEEE Transactions on Computers, Vol. 44, No. 2, titled EVENODD: *An Efficient Scheme for Tolerating Double Disk Failures in RAID Architectures*, by Blaum et al, February, 1995. A variant of EVENODD is disclosed in U.S. Pat. No. 5,579,475, titled *Method and Means for Encoding and Rebuilding the Data Contents of up to Two Unavailable DASDs in a DASD Array using Simple Non-Recursive Diagonal and Row Parity*, by Blaum et al., issued on Nov. 26, 1996. The above-mentioned article and patent are hereby incorporated by reference as though fully set forth herein.

Specifically, the EVENODD technique utilizes two parity disks, a row parity disk containing all (and only) row parities for the data disks and a diagonal parity disk containing all (and only) diagonal parities for those disks. In other words, the row and diagonal parity blocks are not distributed among different disks in each stripe. In an array of n×(n−1) data blocks, there are exactly n diagonals each of length, n−1, if the diagonals "wrap around" at the edges of the array. The key to reconstruction of the EVENODD parity arrangement is that each diagonal parity set contains no information from one of the data disks. However, there is one more diagonal than there are blocks to store the parity blocks for the diagonals within a set of uniform depth stripes. That is, the EVENODD parity arrangement results in a diagonal parity set that does not have an independent parity block. To accommodate this extra "missing" parity block, the EVENODD arrangement XOR's the parity result of one diagonal into the parity blocks for each of the other diagonals.

FIG. 1 is a schematic block diagram of a prior art disk array 100 that is configured in accordance with the conventional EVENODD parity arrangement. Each data block Dab belongs to parity sets a and b, where the parity block for each parity set is denoted Pa. Note that for one distinguished diagonal (X), there is no corresponding parity set. This is where the EVENODD property arises. In order to allow reconstruction from two failures, each data disk must not contribute to at least one parity set. By avoiding a square array of n×n data blocks, the diagonal parity sets have n−1 data block members. Yet, as noted, such an arrangement does not have a location for storing the parity block for all the diagonals. Therefore, the parity of the extra (missing) diagonal parity block (X) is recorded by XOR'ing that diagonal parity into the parity of each of the other diagonal parity blocks. Specifically, the parity of the missing diagonal parity set is XOR'd into each of the parity blocks P4 through P7 such that those blocks are denoted P4X–P7X.

For reconstruction, the parity of the diagonal that does not have a parity block is initially recomputed by XOR'ing all of the parity blocks. For example, the sum of all the row parities is the sum of all the data blocks. The sum of all the diagonal parities is the sum of all the data blocks minus the sum of the missing diagonal parity block. Therefore, the XOR of all parity blocks is equivalent to the sum of all the blocks (the row parity sum) minus the sun of all the blocks except the missing diagonal, which is just a parity of the missing diagonal. Actually, n−1 copies of the missing diagonal parity are added into the result, one for each diagonal parity block. Since n is an odd prime number, n−1 is even, resulting in the XOR of a block with itself an even number of times (which is a zero block). Accordingly, the sum of the diagonal parity blocks with the additional missing parity added to each is equal to the sum of the diagonal parity blocks without the additional diagonal parity.

Next, the missing diagonal parity is subtracted from each of the diagonal parity blocks. After two data disks fail, there are at least two diagonal parity sets that are missing only one block. The missing blocks from each of those parity sets can be reconstructed, even if one of the sets is the diagonal for which there is not a parity block. In any case, there is at least one block that can be reconstructed. Once that block is reconstructed, all but one member of one of the row parity sets is available. This allows reconstruction of the missing member of that row. Reconstruction occurs on another diagonal, which provides enough information to reconstruct the last missing block on that diagonal.

Since n is prime, a cycle is not formed in the reconstruction until all the missing data blocks have been reconstructed. If n were not prime, this would not be true in all cases. If both parity disks are lost, a simple reconstruction of parity from data can be performed. If a data disk and the diagonal parity disk are lost, a simple RAID-4 style reconstruction of the data disk is performed using row parity followed by reconstruction of the diagonal parity disk. If a data disk and the row parity disk are lost, then a diagonal parity may be computed. Since all diagonals have the same parity, the missing block on each diagonal can subsequently be computed.

The EVENODD technique thus allows reconstruction of a lost block within a horizontal parity set in view of a double failure. Since each block is further organized into a diagonal parity set, when two disks are lost (a double failure), there are two parity sets that have lost only one member. Each disk has a parity set that is not represented on that disk. Accordingly, for a double failure, there are two parity sets that can be reconstructed.

Although the EVENODD technique is optimal in terms of the amount of parity information, the amount of computation required for both encoding and decoding is only asymptotically optimal. This is because of the extra computation required to add the missing diagonal parity into each of the diagonal parity blocks. That is, all diagonal parity blocks must be updated for any small write operation to a data block along the diagonal. Extra computation is also needed for a large write operation. Moreover, extra computation is required to reconstruct a lost disk after a failure, as the parity of the missing diagonal must be computed in all reconstruction scenarios. In most cases, this is done by adding all of the blocks in a stripe for the two surviving parity disks.

Therefore, the present invention is directed to a technique that protects against a double failure by allowing recovery of data from any one or combination of two lost disks within a disk array.

SUMMARY OF THE INVENTION

The invention comprises a technique for efficiently organizing and distributing parity blocks among storage devices, such as disks, of an array coupled to a storage system. The array comprises a plurality of disks, each of which is divided into blocks of fixed size. The blocks are then organized into stripes, wherein each stripe contains one disk that holds only row parity blocks, another disk that holds only diagonal parity blocks and the remaining disks that hold data blocks. Notably, the number of blocks on each disk of each stripe is initially equal such that an even disk length arises within each stripe. Thereafter, an extra parity block is appended within each stripe to the disk holding the diagonal parity blocks. Each data block of the array is assigned to two parity sets and any one or any combination of two disks can fail concurrently and the data on the failed disks can be reconstructed.

Broadly stated, the novel technique distributes the parity blocks among the disks of each stripe to thereby reduce the amount of computation for diagonal parity encoding and decoding required by the conventional EVENODD parity arrangement. As noted, the EVENODD parity arrangement results in a diagonal parity set that does not have an independent diagonal parity block. The diagonal parity of this "missing" parity block is recorded by performing an additional exclusive-OR (XOR) operation of that parity into the parity of each of the other diagonal parity blocks of the arrangement.

According to an aspect of the present invention, the distributed parity technique obviates the additional XOR operations by appending the extra parity block to the stripe in the disk holding the diagonal parity blocks within each stripe. However, the insertion of this extra parity block increases the length of the diagonal parity disk within each stripe. In other words, by inserting the missing diagonal parity block onto the diagonal parity disk, an uneven disk length arises within each stripe. According to another aspect of the invention, the parity blocks are distributed among the disks differently in different stripes, thereby balancing the lengths of all the disks after a predetermined number of recurrences of the pattern involving the uneven length of the diagonal parity disk.

Specifically, for each recurrence of a parity assignment pattern, the entire pattern is rotated one disk position so that the rows of the disks change from recurrence to recurrence. The disk holding the diagonal parity blocks, and hence containing the extra parity block, is different in each pattern recurrence. After a plurality of recurrences of the pattern that occurs in arrays of large disks, the sizes of all the disks are balanced.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 1 is a schematic block diagram of a prior art disk array that is configured in accordance with a conventional EVENODD parity arrangement;

FIG. 4 is a block diagram of a distributed parity layout of a disk array according to the present invention.

DETAILED DESCRIPTION OF AN ILLUSTRATIVE EMBODIMENT

Figure 2:
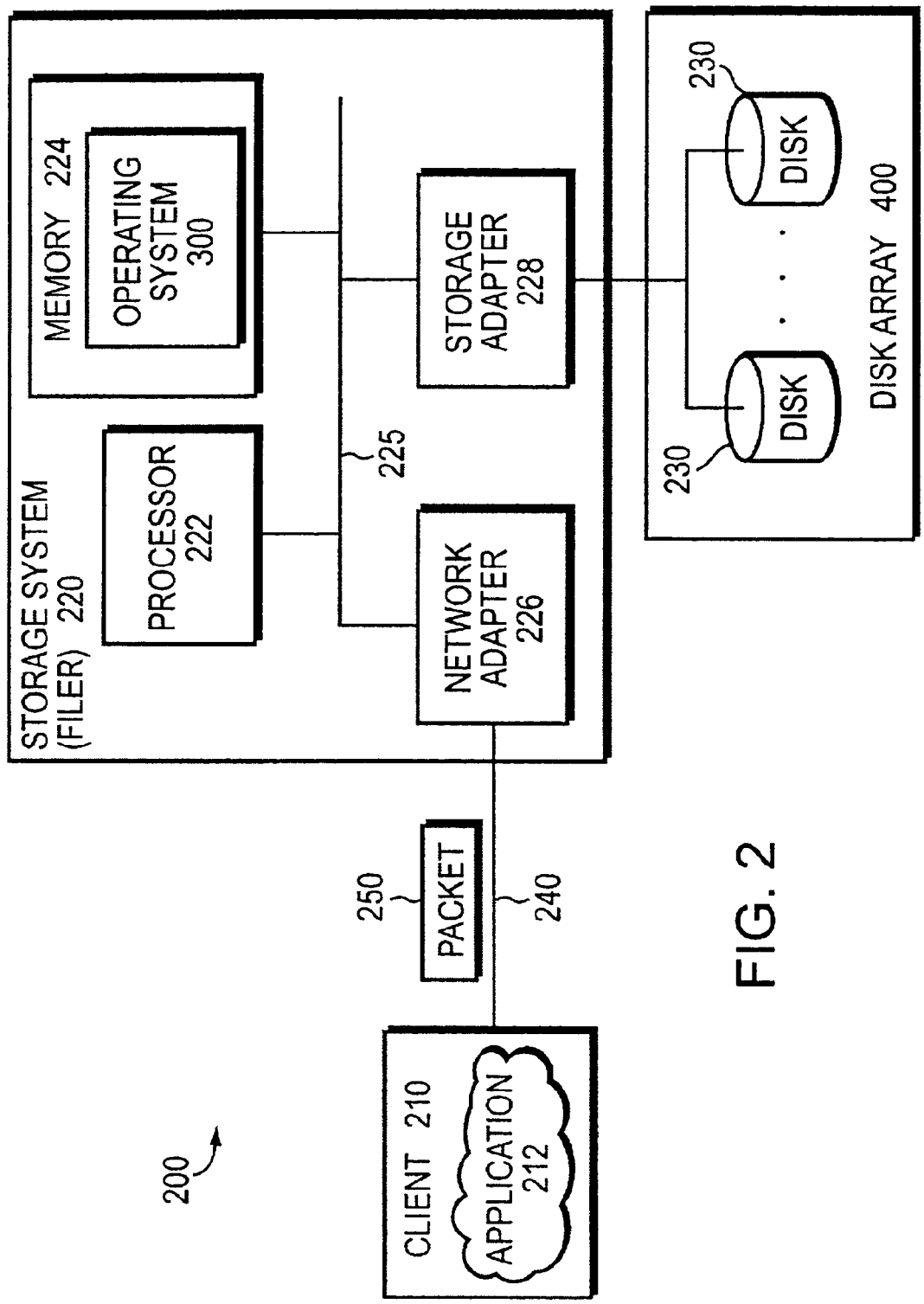
FIG. 2 is a schematic block diagram of an environment including a file server that may be advantageously used with the present invention.

FIG. 2 is a schematic block diagram of an environment 200 including a file server, such as a network storage appliance, that may be advantageously used with the present invention. The file server or filer 220 is a computer that provides file service relating to the organization of information on storage devices, such as disks 230 of a disk array 400. The filer 220 comprises a processor 222, a memory 224, a network adapter 226 and a storage adapter 228 interconnected by a system bus 225. The filer 220 also includes a storage operating system 300 that implements a file system to logically organize the information as a hierarchical structure of directories and files on the disks.

In the illustrative embodiment, the memory 224 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the filer 220 to a client 210 over a computer network 240, which may comprise a point-to-point connection or a shared medium, such as a local area network. The client 210 may be a general-purpose computer configured to execute applications 212. Moreover, the client 210 may interact with the filer 220 in accordance with a client/server model of information delivery. That is, the client may request the services of the filer, and the filer may return the results of the services requested by the client, by exchanging packets 250 encapsulating, e.g., the Common Internet File System (CIFS) protocol or Network File System (NFS) protocol format over the network 240.

The storage adapter 228 cooperates with the storage operating system 300 executing on the filer to access information requested by the client. The information may be stored on any type of attached array of writeable media such as video tape, optical, DVD, magnetic tape, bubble memory and any other similar media adapted to store information, including data and parity information. In the illustrative embodiment described herein, however, the information is preferably stored on the disks 230 of array 400. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 222 (or the adapter 228 itself) prior to being forwarded over the system bus 225 to the network adapter 226, where the information is formatted into a packet and returned to the client 210.

Storage of information on array 400 is preferably implemented as one or more storage "volumes" that comprise a cluster of physical storage disks 230, defining an overall logical arrangement of disk space. Each volume is generally associated with its own file system. The disks within a volume/file system are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate storing of parity information with respect to the striped data.

To facilitate access to the disks 230, the storage operating system 300 implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. In the illustrative embodiment described herein, the storage operating system is preferably the NetApp® Data ONTAP™ operating system available from Network Appliance, Inc., Sunnyvale, Calif. that implements a Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 3:
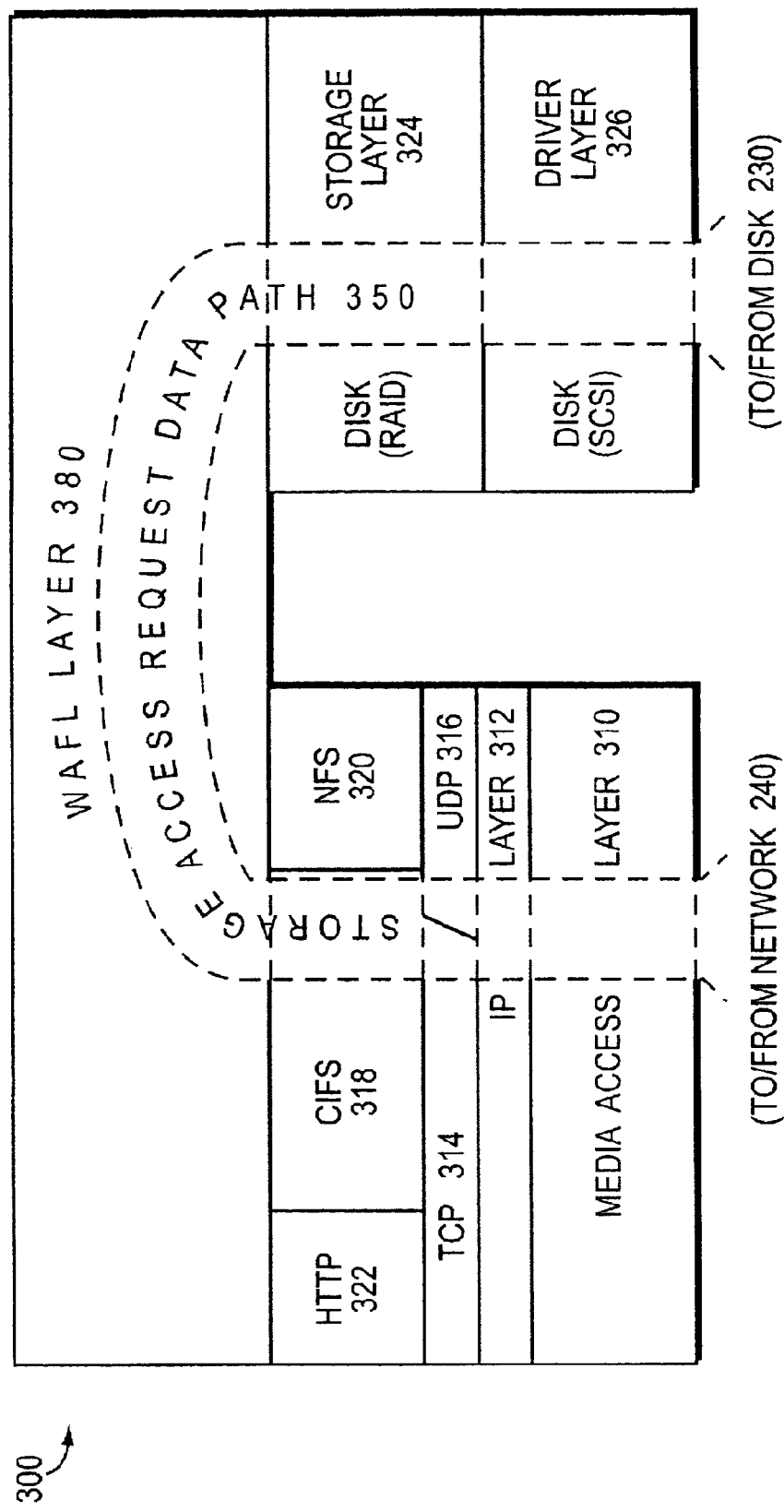
FIG. 3 is a schematic block diagram of a storage operating system including a write anywhere file layout (WAFL) file system layer that may be advantageously used with the present invention.

FIG. 3 is a schematic block diagram of the Data ONTAP operating system 300 that may be advantageously used with the present invention. The storage operating system comprises a series of software layers, including a media access layer 310 of network drivers (e.g., an Ethernet driver). The operating system further includes network protocol layers, such as the Internet Protocol (IP) layer 312 and its supporting transport mechanisms, the Transport Control Protocol (TCP) layer 314 and the User Datagram Protocol (UDP) layer 316. A file system protocol layer provides multi-protocol data access and, to that end, includes support for the CIFS protocol 318, the NFS protocol 320 and the Hypertext Transfer Protocol (HTTP) protocol 322. In addition, the storage operating system 300 includes a disk storage layer 324 that implements a disk storage protocol, such as a RAID protocol, and a disk driver layer 326 that implements a disk access protocol such as, e.g., a Small Computer Systems Interface (SCSI) protocol.

Bridging the disk software layers with the network and file system protocol layers is a WAFL layer 380 that preferably implements the WAFL file system. The on-disk format representation of the WAFL file system is block-based using, e.g., 4 kilobyte (kB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk.

Operationally, a request from the client 210 is forwarded as, e.g., a conventional CIFS or NFS protocol packet 250 over the computer network 240 and onto the filer 220 where it is received at the network adapter 226. A network driver of the media access layer 310 processes the packet, passes it onto the network protocol layers 312–316 and CIFS or NFS layer 318, 320 for additional processing prior to forwarding to the WAFL layer 380. Here, the WAFL file system generates operations to load (retrieve) the requested data from disk 230 if it is not resident "in core", i.e., in the memory 224. If the information is not in memory, the WAFL layer 380 indexes into the inode file using the inode number to access an appropriate entry and retrieve a logical volume block number (VBN). The WAFL layer then passes the logical VBN to the disk storage (RAID) layer 324, which maps that logical number to a disk block number and sends the latter to an appropriate driver (e.g., SCSI) of the disk driver layer 326. The disk driver accesses the disk block number from disk 230 and loads the requested data block(s) in memory 224 for processing by the filer. Upon completion of the request, the filer (and operating system) returns a reply to the client 210 over the network 240.

It should be noted that the software "path" through the storage operating system layers described above needed to perform data storage access for the client request received at the filer may alternatively be implemented in hardware. That is, in an alternate embodiment of the invention, the storage access request data path 350 may be implemented as logic circuitry embodied within a field programmable gate array (FPGA) or an application specific integrated circuit (ASIC). This type of hardware implementation increases the performance of the file service provided by filer 220 in response to a file system request packet 250 issued by client 210. Moreover, in another alternate embodiment of the invention, the processing elements of adapters 226, 228 may be configured to offload some or all of the packet processing and storage access operations, respectively, from processor 222, to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., server) or general-purpose computer, including a standalone computer or portion thereof, embodied as or including a storage system. To that end, filer 220 is hereinafter described as an exemplary implementation of a storage system 220. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present invention comprises a technique for efficiently organizing and distributing parity blocks among disks 230 of a disk array 400 coupled to a storage system 220. The novel technique is preferably implemented by the disk storage (RAID) layer 324 to distribute the parity blocks among the disks of each stripe, thereby reducing the amount of computation needed by the layer to encode and decode the diagonal parity of the conventional EVENODD parity arrangement. As noted, the EVENODD parity arrangement results in a diagonal parity set that does not have an independent diagonal parity block. Accordingly, the diagonal parity of this "missing" parity block is recorded by performing an additional exclusive OR (XOR) operation of that parity into the parity of each of the other diagonal parity blocks of the prior arrangement. As described further herein, the present invention does not need to perform that additional XOR operation.

FIG. 4 is a block diagram of a distributed parity layout of a disk array 400 according to the present invention. The notation used in FIG. 4 denotes stripe number (Sx), then either Dab for a data block belonging to parity sets a and b in that stripe or Pa for the parity block in that stripe for a parity set a. The disk array 400 comprises a plurality of disks (Disks 0–6), each of which is divided into blocks 402 of fixed size. The number of data disks is a prime number such that the total number of disks n within the array is any prime number >2 plus two (the latter being the two parity disks). The blocks are organized into stripes (S0–6) 410, wherein each stripe contains one disk that holds only row parity blocks (P0–3), another disk that holds only diagonal parity blocks (P4–P8) and the remaining disks that hold data blocks. Each data block 402 of the array 400 belongs to two parity sets and any one or any combination of two disks can fail concurrently and the data on the failed disks can be reconstructed.

According to an aspect of the present invention, the distributed parity technique obviates the additional XOR operations by appending an extra parity block (e.g., P8) within each stripe to the disk holding the diagonal parity blocks within that stripe. However, the insertion of this extra parity block increases the length of the diagonal parity disk within each stripe 410. By inserting the missing diagonal parity block onto the diagonal parity disk, an uneven disk length arises within each stripe. According to another aspect of the invention, the parity blocks are distributed among the disks of each stripe, thereby balancing the lengths of all the disks after a predetermined number of recurrences of the pattern involving the uneven diagonal parity disk. Notably, the disk containing the diagonal parity and the extra parity block is different in each pattern recurrence. That is, the parity assignment pattern continues across the disks, with the extra parity block P8 being rotated to a different disk in each stripe until all disks are of the same size. The resulting layout or "super-stripe" 450 is then repeated over the full length of the disks.

In the illustrative embodiment, a stripe block is a fixed number of blocks that comprises a set of contiguous blocks on a disk, all of which are members of the same stripe. Each disk contributes one stripe block to each stripe. The size of the stripe block (i.e., the stripe depth) preferably corresponds to some multiple of the minimum amount of data contiguously accessed from a disk, typically a power of two multiple of 4 k bytes. The stripe depth of the disks in FIG. 4 is generally four (4) blocks, with the exception of the disk holding the diagonal parity, which has five (5) blocks. Horizontal parity is computed in accordance with the conventional technique for a row parity set, whereas diagonal parity is computed using various portions (blocks) of the stripe block within each disk. Each stripe 410 thus contains sufficient information to enable recovery (reconstruction) from the loss of any two disks, despite the stripe depth of the failed disks.

Parity is calculated as the XOR of data blocks to form a parity block. The XOR operation is generally performed over the same 1-bit field in each input block to produce a single corresponding bit of output. As noted, the XOR operation is equivalent to two's complement addition or subtraction of two 1-bit fields. Redundant parity information may also be computed as the sum of similarly sized multi-bit fields (e.g., 8, 16, 32, 64, 128 bits) in all the inputs. For example, the equivalent of parity may be computed by adding data using two's complement addition on 32-bit fields to produce each 32 bits of redundant information. This is only the case assuming non-reliance on the fact that an XOR operation directed to the same input twice into a block produces the original content of the block, as the XOR of a block with itself produces zero. The inventive technique described herein does not rely on this aspect of XOR and, hence, may be implemented by addition and subtraction over fields wider than one bit.

It will be apparent to those skilled in the art that a block (for purposes of parity computation) may or may not correspond to a file block, a database block, a disk sector or any other conveniently sized unit. There is no requirement that the block size used for parity computation have any relation to any other "blocks" used in the system. However, it is expected that one or more integer number of parity blocks will fit into a unit defined to be one or more integer number of disk sectors. In general, these blocks will correspond to file system or database blocks, and will typically be of size 4 k (4096) or some higher power of two bytes (e.g., 8 k, 16 k, 32 k, 64 k, 128 k, 256 k).

In an alternate embodiment of the invention, the stripe depth can increase only if the total number of disks in the array increases. In all cases, the number of disks must be prime plus two. For example, if the disk array increases from 5 data disks plus 2 parity disks (i.e., 7 total disks) to 7 data disks plus 2 parity disks (i.e., 9 total disks), then the number of blocks within each stripe increases. This is because the lengths of the diagonals increase since the diagonal length is equal to the total number of data disks minus one (e.g., 6). This, in turn, changes the pattern and rows of the disks (and their blocks) along with their assignment to parity sets. Nevertheless, the length of the diagonal parity disk is always one block longer than the remaining disk length for each stripe in the array.

It is therefore clear that the positions of the parity (information) blocks on disks within each stripe rotate among all the disks in a distributed enhancement to the conventional EVENODD arrangement. Such rotation essentially provides a RAID-5 style implementation in that the parity information is distributed among the disks, as is the load that falls upon the parity disks. The distributed parity technique solves the problem of the uneven disk length of the diagonal parity disk within each stripe of the novel array layout enhancement. In other words, the missing diagonal parity (i.e., P8) is included within the diagonal parity disk to thereby render an uneven disk length within each stripe. However, by distributing the parity information among the disks of each stripe, the sizes of all the disks become balanced after a plurality of (i.e., seven) recurrences of the pattern involving the uneven diagonal parity disk.

Figure 5:
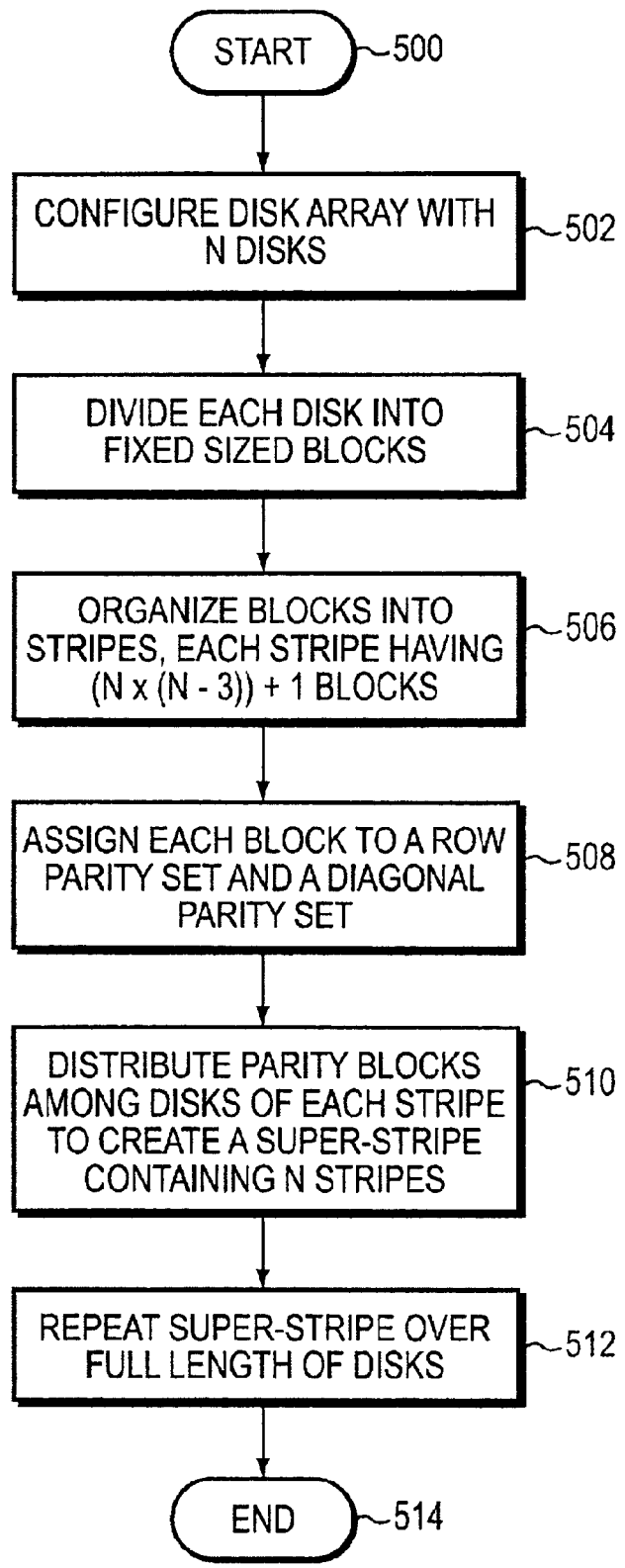
FIG. 5 is a flowchart illustrating a sequence of steps of a distributed parity technique according to the present invention.

FIG. 5 is a flowchart illustrating the sequence of steps comprising the distributed parity technique of the present invention. With reference also to FIG. 4, the sequence starts in Step 500 and proceeds to Step 502 wherein a disk array is configured with n disks, each of the same size, and where n is any prime number plus 2. The disks are generally numbered from 0 to n−1. Each disk is divided into data blocks 402 of fixed size (Step 504), so that the blocks on each disk are of the same size. The blocks are then organized into predetermined groups or stripes 410 in Step 506. Notably, each stripe comprises (n×(n−3))+1 blocks. Each disk contains a pattern of data and parity blocks within a stripe, wherein the parity blocks can be either row or diagonal parity and wherein the disk containing the diagonal parity is different in each pattern recurrence.

Specifically, there are n−2 diagonals and n−3 rows in each stripe 410. All parity is computed within a stripe. Each stripe contains one disk that holds only row parity blocks and another disk that holds only diagonal parity blocks. Blocks that are in the same row from a parity standpoint are not necessarily at the same position on each disk. However, the positions of the blocks in the same row from a parity standpoint are no more than one different for all blocks in the row. All other disks in a stripe hold data blocks. There are n−3 data blocks per stripe per disk on the disks that hold data blocks in that stripe. In addition, there are n−3 parity blocks per stripe per disk on the one disk that holds row parity in that stripe and there are n−2 parity blocks per stripe per disk on the one disk that holds diagonal parity in that stripe.

In Step 508, each block is assigned to two parity sets within the stripe, such that any one or any combination of two disks can fail concurrently and data on the failed disks can be reconstructed. For example, data blocks are assigned to row parity sets according to the position of the data block in the stripe. The first (lowest numbered) data block on each disk in each stripe belongs to a first parity set, and its parity is stored on the first (lowest numbered) parity block on the row parity disk for that stripe. Without loss of generality and for an array of n disks, with n−3 rows per stripe and one extra block per stripe, the membership of any block d of disk i is determined by (d %(n×(n−3)+1))=d1. Without loss generality, if d1<(n−3)(n−i−1), d2=d1%(n−3)

else if d1>(n−3)(n−i−1), d2=(d1−1)%(n−3)

else if d1=(n−3)(n−i−1), d2=n−4 where d1 is an intermediate result that factors out all of the complete repetitions of the pattern and d2 is the row parity set to which the block belongs within a stripe, if it is not a diagonal parity block. The stripe s to which each block belongs within a group of stripes that contain a complete repetition of the pattern is:

if d1≦(n−3)(n−i−1),s=d1/(n−3)

else s=(d1−1)/(n−3)

There are n−2 diagonals that can be selected from the data blocks in a stripe. The data blocks are further assigned to diagonal parity sets as follows. Within a stripe data disks are numbered from 0 to n−3, starting from the disk that is next higher to the diagonal parity disk, and proceeding to the disk that is next lower to the row parity disk. When the last disk is reached, the assignment returns to disk 0. Using this assignment of numbers to disks and without loss of generality, data block b of disk i in the stripe belongs to diagonal parity set (i+b)%(n−2), wherein % is a modulus operator used to produce a result representing the remainder upon dividing (i+b) by (n−2). The parity of this set is stored in parity block (i+b)%(n−2) of the parity blocks in the diagonal parity disk in that stripe.

In Step 510, the parity blocks are distributed among the disks of each stripe to thereby create a super-stripe 450 that balances the lengths of the disks. In other words, the parity assignment pattern continues across the disks until all disks have the same size. Each super-stripe contains n stripes and all blocks in a stripe on a disk are contiguous. In the first stripe of each super-stripe, the first n−2 disks hold data, the next disk holds row parity (P0–3) and the last disk holds diagonal parity (P4–8) for that stripe. Within each subsequent stripe, the roles of the disks (whether data, row parity or diagonal parity) are rotated to one disk lower. This continues until all disks have played all roles, after n stripes. This completes a super-stripe 450.

For example and without loss of generality, in stripe i of each super-stripe, 0<=i<n, disk n−1−i contains diagonal parity and disk n−2−i contains row parity in that stripe. If the quantity n−2−i is negative, n is added to that quantity to get the correct disk number. Note that using the original disk numbering, in stripe i of each super-stripe, disk i contains diagonal parity, and has n−2 parity blocks. In all other stripes, that disk has n−3 blocks, either data or parity.

In Step 512, the super-stripe 450 repeats over the full length of the disks. Notably, the super-stripe repeats every (n×(n−3))+1 blocks on each disk. The sequence then ends in Step 514.

While there has been shown and described an illustrative embodiment for efficiently organizing and distributing parity blocks among storage devices of a storage array coupled to a storage system, it is to be understood that various other adaptations and modifications may be made within the spirit and scope of the invention. In particular, those skilled in the art will recognize that the parity technique derived from the present invention for a given number of disks can be permuted in several ways to render other parity assignments that are essentially equivalent to the illustrative assignment described herein. For example, in any disk, any block may be moved to any position, exchanging it with the block in any other position. Although this does not affect the contents of the blocks, it does alter the assignment of the blocks to parity sets. The swapping of blocks within a disk can be performed any number of times to produce any permutation within the disk of block assignments to parity sets.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently organizing and distributing parity blocks among storage devices of an array coupled to a storage system, the method comprising the steps of:

configuring the array with a first predetermined number of devices;

dividing each device into blocks;

organizing the blocks into stripes, wherein each stripe contains a first device that holds only row parity blocks, a second device that holds only diagonal parity blocks and remaining devices that hold data blocks, and wherein the number of blocks on each device of each stripe is equal;

appending an extra parity block within each stripe to the second device holding the diagonal parity blocks within that stripe, such that an uneven device length arises within the stripe; and assigning each data block to one row parity set and one diagonal parity set, such that any one or any combination of two devices can fail concurrently and data on the failed devices can be reconstructed.

2. The method of claim 1 wherein the step of dividing comprises the step of dividing each device into blocks of fixed size.

3. The method of claim 1 wherein the first predetermined number of devices is n.

4. The method of claim 3 wherein n is any prime number plus 2.

5. The method of claim 3 further comprising the step of distributing the parity blocks among the devices of each of n different adjacent stripes to create a super-stripe containing n stripes that balances the sizes of the devices.

6. The method of claim 5 further comprising the step of repeating the super-stripe over an entire length of the devices.

7. The method of claim 3 wherein the step of organizing comprises the step of organizing the blocks into stripes, each stripe comprising (n×(n−3))+1 blocks.

8. The method of claim 1 wherein the step of appending comprises the step of obviating additional exclusive-OR (XOR) operations to thereby reduce the amount of computation needed to encode diagonal parity.

9. The method of claim 8 further comprising the step of computing parity contained in the parity blocks using addition over fixed size multi-bit fields.

10. The method of claim 9 wherein the fixed size of the multi-bit fields is one of 8, 16, 32, 64 and 128 bits.

11. The method of claim 1 wherein the step of organizing comprises the steps of:

exchanging a first block at a first position on a device to a second position of a second block on the device without affecting contents of the blocks; and altering assignment of the blocks to parity sets.

12. A system for efficiently organizing and distributing parity blocks among devices coupled to a storage system, the system comprising:

an array having a plurality of devices, each device divided into blocks of fixed size, the blocks organized into stripes, wherein each stripe contains a first device that holds only row parity blocks, a second device that holds only diagonal parity blocks and remaining devices that hold data blocks and wherein the number of blocks on each device of each stripe is equal;

a storage operating system including a device storage layer configured to implement a distributed parity technique that appends an extra parity block within each stripe to the second device holding the diagonal parity blocks within that stripe, such that an uneven device length arises within that stripe, the device storage layer assigning each data block to one row parity set and one diagonal parity set, such that any one or any combination of two devices can fail concurrently and data on the failed devices can be reconstructed; and a processing element configured to execute the storage operating system to thereby invoke storage access operations to and from the array in accordance with the distributed parity technique.

13. The system of claim 12 wherein the device storage layer further distributes the parity blocks among the devices of each stripe to create a super-stripe that balances the sizes of the devices.

14. The system of claim 13 wherein the devices are disks and wherein the device storage layer is a RAID layer.

15. The system of claim 14 wherein the RAID layer is implemented in logic circuitry.

16. The system of claim 13 wherein the devices are one of video tape, magnetic tape, optical, DVD and bubble memory devices.

17. The system of claim 13 wherein the devices are media adapted to store information contained within the data and parity blocks.

18. The system of claim 12 wherein the fixed size of the blocks is 4 k bytes.

19. The system of claim 12 wherein the fixed size of the blocks is a power of two number of bytes.

20. The system of claim 19 wherein the high power of two bytes is one of 4 k, 8 k, 16 k, 32 k, 64 k, 128 k and 256 k bytes.

21. Apparatus for efficiently organizing and distributing parity blocks among disks of a disk array coupled to a storage system, the apparatus comprising:

means for configuring the disk array with a first predetermined number of disks;

means for dividing each disk into blocks;

means for organizing the blocks into stripes, wherein each stripe contains a first disk that holds only row parity blocks, a second disk that holds only diagonal parity blocks and remaining disks that hold data blocks, and wherein the number of blocks on each disk of each stripe is equal;

means for appending an extra parity block within each stripe to the second disk holding the diagonal parity blocks within that stripe, such that an uneven disk length arises within the stripe; and means for assigning each data block to one row parity set and one diagonal parity set, such that any one or any combination of two disks can fail concurrently and data on the failed disks can be reconstructed.

22. The apparatus of claim 21 further comprising means for distributing the parity blocks among the disks of each stripe to create a super-stripe that balances the sizes of the disks.

23. The apparatus of claim 22 further comprising means for repeating the super-stripe over an entire length of the disks.

24. The apparatus of claim 21 wherein the means for appending comprises means for obviating an additional exclusive-OR operation to thereby reduce the amount of computation needed to encode diagonal parity.

25. A computer readable medium containing executable program instructions for efficiently organizing and distributing parity blocks among disks of a disk array coupled to a storage system, the executable program instructions comprising program instructions for:

configuring the disk array with a first predetermined number of disks;

dividing each disk into blocks;

organizing the blocks into stripes, wherein each stripe contains a first disk that holds only row parity blocks, a second disk that holds only diagonal parity blocks and remaining disks that hold data blocks, and wherein the number of blocks on each disk of each stripe is equal;

appending an extra parity block within each stripe to the second disk holding the diagonal parity blocks within that stripe, such that an uneven disk length arises within the stripe; and assigning each data block to one row parity set and one diagonal parity set, such that any one or any combination of two disks can fail concurrently and data on the failed disks can be reconstructed.

26. The computer readable medium of claim 25 further comprising program instructions for distributing the parity blocks among the disks of each stripe to create a super-stripe that balances the sizes of the disks.

27. The computer readable medium of claim 26 further comprising program instructions for repeating the super-stripe over an entire length of the disks.

28. The computer readable medium of claim 25 wherein the program instruction for appending comprises program instructions for obviating additional exclusive-OR operations to thereby reduce the amount of computation needed to encode diagonal parity.

29. A method for efficiently organizing and distributing parity blocks among storage devices of an array coupled to a storage system, the method comprising the steps of:

configuring the array with n storage devices;

dividing each storage device into blocks;

organizing the blocks into stripes, wherein each stripe comprises (n×(n−3))+1 blocks, each storage device containing a pattern of data and parity blocks within a stripe, the parity blocks being one of row and diagonal parity, the storage device containing the diagonal parity is different in each pattern recurrence.

30. The method of claim 29 where n is any prime number plus 2.

* * * * *